(12) United States Patent
Carman et al.

(10) Patent No.: US 8,691,734 B2
(45) Date of Patent: *Apr. 8, 2014

(54) METHOD OF FRACTURING WITH PHENOTHIAZINE STABILIZER

(75) Inventors: Paul S. Carman, Spring, TX (US); D. V. Satyanarayana Gupta, The Woodlands, TX (US)

(73) Assignee: Baker Hughes Incorporated, Houston, TX (US)

(*) Notice: Subject to any disclaimer, the term of this patent is extended or adjusted under 35 U.S.C. 154(b) by 260 days.

This patent is subject to a terminal disclaimer.

(21) Appl. No.: 13/236,378

(22) Filed: Sep. 19, 2011

(65) Prior Publication Data

US 2012/0006551 A1 Jan. 12, 2012

Related U.S. Application Data

(63) Continuation-in-part of application No. 12/020,671, filed on Jan. 28, 2008, now Pat. No. 8,022,015.

(51) Int. Cl.
*C09K 8/60* (2006.01)
*C09K 8/528* (2006.01)
*E21B 43/26* (2006.01)
*E21B 43/00* (2006.01)

(52) U.S. Cl.
USPC ..... 507/202; 507/224; 166/308.5; 166/308.6; 166/309

(58) Field of Classification Search
USPC ............ 507/202, 224; 166/308.5, 308.6, 309
See application file for complete search history.

(56) References Cited

U.S. PATENT DOCUMENTS

| | | | |
|---|---|---|---|
| 3,146,200 A | 8/1964 | Goldstein |
| 3,225,000 A | 12/1965 | Welch |
| 4,624,795 A | 11/1986 | Dawson et al. |
| 5,069,283 A | 12/1991 | Mack |
| 5,515,920 A | 5/1996 | Luk |
| 5,520,848 A | 5/1996 | Evans |
| 5,558,160 A | 9/1996 | Tudor |
| 5,759,964 A | 6/1998 | Shuchart et al. |
| 5,883,053 A | 3/1999 | Tudor |
| 5,960,877 A | 10/1999 | Funkhouser et al. |
| 6,017,855 A | 1/2000 | Dawson et al. |
| 6,383,990 B1 | 5/2002 | Dawson et al. |
| 6,395,853 B1 | 5/2002 | Oswald et al. |
| 6,410,489 B1 | 6/2002 | Zhang |
| 6,509,300 B1 | 1/2003 | Gupta |
| 6,649,572 B2 | 11/2003 | Dawson et al. |
| 6,729,409 B1 | 5/2004 | Gupta |

(Continued)

FOREIGN PATENT DOCUMENTS

CA 2641479 A1 10/2008
DE 102005056436 A1 5/2007

(Continued)

*Primary Examiner* — Aiqun Li
(74) *Attorney, Agent, or Firm* — John Wilson Jones; Jones & Smith, LLP (57) ABSTRACT

Well treatment fluids and methods of treating high temperature subterranean formations of up to about 500° F. (260° C.) are provided. The well treatment fluids and methods utilize a high molecular weight synthetic copolymer and a pH buffer than maintains a pH in a range of about 4.5 to about 5.25 for the fluids. The high molecular weight synthetic copolymer is derived from acrylamide, acrylamidomethylpropanesulfonic acid, and vinyl phosphonates. The well treatment fluids may be energized or foamed.

20 Claims, 5 Drawing Sheets

(56) References Cited

U.S. PATENT DOCUMENTS

| | | |
|---|---|---|
| 6,820,694 B2 | 11/2004 | Willberg et al. |
| 7,012,044 B2 | 3/2006 | Dawson et al. |
| 7,049,436 B2 | 5/2006 | Gupta |
| 7,205,264 B2 | 4/2007 | Boles |
| 7,638,468 B2 | 12/2009 | Gupta et al. |
| 7,718,582 B2 | 5/2010 | Le et al. |
| 7,918,281 B2 | 4/2011 | Brown et al. |
| 2002/0092652 A1* | 7/2002 | Chatterji et al. .............. 166/308 |
| 2003/0196809 A1 | 10/2003 | Willberg et al. |
| 2004/0244975 A1 | 12/2004 | Heier et al. |
| 2004/0266629 A1 | 12/2004 | Maroy et al. |
| 2005/0039919 A1 | 2/2005 | Harris et al. |
| 2009/0192051 A1 | 7/2009 | Carman et al. |
| 2009/0192058 A1 | 7/2009 | Carman et al. |
| 2010/0089580 A1 | 4/2010 | Brannon et al. |
| 2010/0204069 A1 | 8/2010 | Le et al. |
| 2011/0028354 A1 | 2/2011 | Le et al. |
| 2011/0067875 A1 | 3/2011 | Funkhouser et al. |
| 2011/0114322 A1 | 5/2011 | Plasier et al. |
| 2011/0143970 A1 | 6/2011 | Rieb et al. |

FOREIGN PATENT DOCUMENTS

| | | |
|---|---|---|
| EP | 0658612 B1 | 6/1995 |
| EP | 2166060 A1 | 3/2010 |
| WO | WO2009097286 A1 | 8/2009 |

* cited by examiner

METHOD OF FRACTURING WITH PHENOTHIAZINE STABILIZER

BACKGROUND OF THE INVENTION

This application is a continuation-in-part application of U.S. patent application Ser. No. 12/020,671, filed on Jan. 28, 2008, now U.S. Pat. No. 8,022,015.

FIELD OF THE INVENTION

The invention relates to methods and compositions for treating high temperature subterranean formations. More particularly, it relates to methods and compositions for treating a subterranean formation penetrated by a wellbore into which a high temperature energized or foamed well treatment fluid is injected at temperatures of up to about 500° F. (260° C.).

DESCRIPTION OF THE RELATED ART

The continued exploration for hydrocarbon-containing subterranean formations is frequently requiring operators to drill significantly deeper than prior drilling operations. Besides drilling deeper, operators are always trying to enhance hydrocarbon production. One way of enhancing hydrocarbon production from many formations is by hydraulic fracturing. In the hydraulic fracturing process, a viscous well treatment fluid is injected into the wellbore at such a rate and pressure so that a crack or fracture is opened into the surrounding formation.

Typically, well treatment fluids for hydraulic fracturing contain guar gum or guar gum derivatives or viscoelastic surfactants as thickeners to assist in proppant transport, friction reduction, fluid loss control, and controlling fracture geometry. The hydraulic fracturing fluids generally transport proppant into the fracture to prevent the fracture from fully closing. Besides being able to place the proppant in the fracture, the fluid must be able to degrade by lowering its viscosity so that a low viscosity fluid results that can be easily cleaned out of the fracture just prior to hydrocarbon production.

When treating a subterranean formation which is sensitive to water, it is often necessary to minimize the amount of water in the well treatment fluid. In such instances, it is typically preferred to mix a foaming agent with the treatment fluid. This allows for a reduction in the amount of water introduced into the formation without loss of treatment fluid volume. Recovery of fluids is thereby enhanced. Suitable foaming agents include foaming gases such as nitrogen and carbon dioxide. In some cases, a mixture of such gases may be used. A mixture of two of such gases is referred to as a binary composition.

Typically, the word "energized" refers to a fluid containing two phases whereby less than 53 volume percent of the internal phase is either a gas or a liquid (e.g. nitrogen or liquid $CO_2$). Typically, the term "foamed" refers to a fluid wherein greater than 53 volume percent of the internal phase of the fluid is either a gas or a liquid. Energized or foamed fluids are particularly applicable to under-pressured gas reservoirs and wells which are rich in swellable and migrating clays.

As the drilling depths continue to increase, the formation temperatures also increase. Unfortunately, as temperatures exceed 325° F. (162.8° C.), many guar-based fracturing fluids (including foamed or energized guar-based fracturing fluids) become ineffective because they lose their viscosity in part or in whole. Many guar-based fracturing fluids degrade at rates preventing optimum proppant placement, fluid loss control, or fracture geometry.

At high temperatures, guar-based polymers readily undergo auto-degradation by a number of methods, usually within periods of time shorter than what is necessary to complete the fracturing treatment. The degradation generally gets worse as the temperatures continue to increase. Increasing temperatures exasperates this behavior. Most degradation results in the cleavage of the polymer chains, which simultaneously reduces the fluid's viscosity. This can be due to oxidation from residual amounts of air entrained in the fluid, thermal induced cleavage of the acetal linkage along the polymer backbone, hydrolysis of the polymer, or a combination thereof.

A need exists for fracturing fluids that can be used in deeper and hotter formations that are in operation while simultaneously being able to degrade in a controlled manner when the fracturing process is complete. A need also exists for energized or foamed fracturing fluids for use in the treatment of deeper and hotter though water sensitive formations. It is further desirable that such fracturing fluids be stable in order to enable the fracturing fluids to travel further distances within the fractures.

SUMMARY OF THE INVENTION

In view of the foregoing, a high temperature well treatment fluid that is capable of fracturing a subterranean formation in temperatures of up to about 500° F. (260° C.) is provided as an embodiment of the present invention. The high temperature well treatment fluid includes water, a high molecular weight synthetic copolymer and a crosslinking agent. The high temperature well treatment fluid may further contain a pH buffer.

In an aspect, the high molecular weight synthetic copolymer is derived from acrylamide, acrylamidomethylpropanesulfonic acid, and vinyl phosphonate. In an aspect, the copolymer comprises about 30-about 80 wt. % acrylamide, about 20-about 50 wt. % acrylamidomethylpropanesulfonic acid, and about 1-about 5 wt. % vinyl phosphonate. The pH buffer enables the high temperature well treatment fluid to maintain a pH in a range of about 4.5 to about 5.25.

A high temperature foamed or energized well treatment fluid is also capable of fracturing a subterranean formation in temperatures of up to about 500° F. (260° C.) is provided as an embodiment of the present invention. The high temperature foamed or energized well treatment fluid includes water, a high molecular weight synthetic copolymer, a crosslinking agent and, optionally, a pH buffer and a foaming agent such as a foaming gas like nitrogen and carbon dioxide and, optionally, a non-gaseous foaming agent. The pH of the high temperature well treatment fluid may be between from about 4.0 and about 6.0 and the pH buffer enables the high temperature well treatment fluid to maintain the pH range.

In an aspect, the foamed or energized fluid contains a high molecular weight synthetic copolymer derived from acrylamide, acrylamidomethylpropanesulfonic acid, and vinyl phosphonate. In an aspect, the copolymer comprises about 30-about 80 wt. % acrylamide, about 20-about 50 wt. % acrylamidomethylpropanesulfonic acid, and about 1-about 5 wt. % vinyl phosphonate.

Besides high temperature well treatment fluid compositions, methods of fracturing subterranean formations are also provided as embodiments of the present invention. In an embodiment, a method of fracturing a subterranean formation having a temperature of up to about 500° F. (260° C.) is provided. In this embodiment, a high temperature well treatment fluid comprising water; a high molecular weight copolymer derived from acrylamide, acrylamidomethylpropanesulfonic acid, and vinyl phosphonate; a crosslinking agent and a pH buffer is contacted with at least a portion of the subterranean formation at pressures sufficient to fracture the subterranean formation. The pH buffer maintains a pH of the high temperature well treatment fluid in a range of about 4.5 to about 5.25.

Another method of fracturing a subterranean formation is provided as another embodiment of the present invention. In this embodiment, water is contacted with a high molecular weight copolymer derived from acrylamide, acrylamidomethylpropanesulfonic acid, and vinyl phosphonate to form a water-soluble polymer. The water-soluble polymer is contacted with a crosslinking agent and a foaming agent to produce a foamed or energized fluid. At least a portion of the subterranean formation is contacted with the foamed or energized fluid at pressures sufficient to fracture the formation. The foamed or energized fluid may further contain a pH buffer, preferably to maintain the pH of the foamed or energized fluid in a range of about 4.0 to about 6.0.

Other additives that are useful in high temperature well treatment fluids described herein can also be used in embodiments of the present invention. Such additives can include additional monomers that can be copolymerized with the high molecular weight polymers of the high temperature well treatment fluids, stabilizers to help the high temperature well treatment fluids perform for extended periods of time, crosslinking agents to help increase the viscosity of the high temperature well treatment fluids, breakers to help break down the high temperature well treatment fluids, surfactants that help with hydration of the high temperature well treatment fluids, and the like. Other suitable compounds that are useful in high temperature well treatment fluids, such as proppant and other additives, will be apparent to those of skill in the art and are to be considered within the scope of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the hydrocarbon recovery operation and in the treatment of well bores. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

A high temperature well treatment fluid that is capable of fracturing a subterranean formation in temperatures of up to about 500° F. (260° C.) is provided as an embodiment of the present invention. In this embodiment, the high temperature well treatment fluid comprises water, a high molecular weight synthetic copolymer, a crosslinking agent, and optionally a pH buffer.

In another embodiment, the high temperature well treatment fluid may be foamed or energized with a foaming agent, such as a foaming gas and, optionally, a non-gaseous foaming agent. The resulting fluid contains two phases—a liquid phase and a gaseous phase. When the gaseous internal phase is less than about 53 volume percent, the fluid is referred to as an "energized fluid". When the gaseous internal phase is greater than 53 volume percent, the fluid is referred to as a "foamed fluid".

The high molecular weight synthetic copolymer is derived from acrylamide, acrylamidomethylpropanesulfonic acid, and vinyl phosphonate. In an aspect, the acrylamide can be derived from at least one amide of an ethylenically unsaturated carboxylic acid. In an aspect, the high molecular weight synthetic copolymer has a K-value of greater than about 375. In an aspect, the K-value ranges between about 50 to about 750; or alternatively, between about 150 to about 350. The K-value (i.e. Fikentscher's K-value) is a measure of a polymer's average molecular weight. The test method generally used by those skilled in the art to calculate the K-value is determined by ISO 1628-2 (DIN 53726). In embodiments of the present invention, the high temperature well treatment fluid comprises about 25 wt. % of the high molecular weight copolymer in an emulsion. The high molecular weight copolymer in emulsion can be present in a range of about 10 gallons per 1,000 gallons high temperature well treatment fluid at temperatures of less than 350° F. (176.7° C.) to about 25 gallons per 1,000 gallons high temperature well treatment fluid at 500° F. (260° C.). The concentration of the high molecular weight synthetic copolymer depends upon the temperature of the subterranean formation and the duration in which the high molecular weight synthetic copolymer will be exposed to the elevated temperatures. In general, more high molecular weight synthetic copolymer is required at higher temperatures than at the lower temperatures.

In an aspect, the copolymer is derived from about 20-about 90 wt. % acrylamide, about 9-about 80 wt. % acrylamidomethylpropanesulfonic acid, and about 0.1-about 20 wt. % vinyl phosphonate; alternatively, about 30-about 80 wt. % acrylamide, about 25-about 60 wt. % acrylamidomethylpropanesulfonic acid, and about 0.2-about 10 wt. % vinyl phosphonate; alternatively, about 40-about 70 wt. % acrylamide, about 30-about 40 wt. % acrylamidomethylpropanesulfonic acid, and about 1-about 3 wt. % vinyl phosphonate; or alternatively, about 50 wt. % acrylamide, about 30 wt. % acrylamidomethylpropanesulfonic acid, about 2 wt. % vinyl phosphonate, and a remainder of copolymers of acrylamide and acrylamidomethylpropanesulfonic acid.

The high temperature well treatment fluid may further be foamed or energized with a suitable gas or liquid or emulsified with a suitable liquid. Foamed and energized fluids reduce the density by reducing the amount of water without loss of treatment fluid volume and increase the viscosity of the well treatment fluid. Their use is especially desirable when treating a subterranean formation which is sensitive to water (such as under-pressured gas reservoirs like dry coal beds and wells which are which are rich in swellable and migrating clays)) where it is desired to minimize the amount of water in the fluid. While nitrogen and liquid $CO_2$ are more common for use as the suitable foaming agent for foamed and energized fluids, any other gas or fluid, such as inert gases, like argon, or natural gas, known in the art may be utilized. In an aspect, the foaming agent is present in a quantity to provide, 53 volume percent to in excess of 96 volume percent internal gas for foamed fluids and from 5 to 53 volume percent of internal gas for energized fluids. In a preferred embodiment, the amount of foaming agent in the treatment fluid is such to provide an energized fluid between from about 20% to 50% by volume of internal gas or a foamed fluid having from about 63 to about 94% by volume of internal gas.

In some instances, it may be desirable to add a non-gaseous foaming agent to the treatment fluid. When used, such non-gaseous foaming agents are typically used in conjunction with a foaming gas. Non-gaseous foaming agents often contribute to the stability of the resulting fluid and reduce the requisite amount of water in the fluid. In addition, such agents typically increase the viscosity of the fluid. For instance, when the amount of internal gas in the treatment fluid exceeds 30% by volume, a non-gaseous foaming agent may further be added to the fluid in order to create a foamed fluid. The addition of a non-gaseous foaming agent typically increases the viscosity of the treatment fluid. In addition to increasing viscosity, the non-gaseous foaming agent further contributes to the stability of the resulting fluid. Non-gaseous foaming agents may be amphoteric, cationic or anionic and may include surfactants based on betaines, alpha olefin sulfonates, sulfate ethers, ethoxylated sulfate ethers and ethoxylates.

Suitable anionic non-gaseous foaming agents include alkyl ether sulfates, ethoxylated ether sulfates, phosphate esters, alkyl ether phosphates, ethoxylated alcohol phosphate esters, alkyl sulfates and alpha olefin sulfonates. Preferred as alpha-olefin sulfonates are salts of a monovalent cation such as an alkali metal ion like sodium, lithium or potassium, an ammonium ion or an alkyl-substituent or hydroxyalkyl substitute ammonium in which the alkyl substituents may contain from 1 to 3 carbon atoms in each substituent. The alpha-olefin moiety typically has from 12 to 16 carbon atoms.

Preferred alkyl ether sulfates are also salts of the monovalent cations referenced above. The alkyl ether sulfate may be an alkylpolyether sulfate and contains from 8 to 16 carbon atoms in the alkyl ether moiety. Preferred as anionic surfactants are sodium lauryl ether sulfate (2-3 moles ethylene oxide), $C_8$-$C_{10}$ ammonium ether sulfate (2-3 moles ethylene oxide) and a $C_{14}$-$C_{16}$ sodium alpha-olefin sulfonate and mixtures thereof. Especially preferred are ammonium ether sulfates.

Suitable cationic non-gaseous foaming agents include alkyl quaternary ammonium salts, alkyl benzyl quaternary ammonium salts and alkyl amido amine quaternary ammonium salts.

Preferred as non-gaseous foaming agent are alkyl ether sulfates, alkoxylated ether sulfates, phosphate esters, alkyl ether phosphates, alkoxylated alcohol phosphate esters, alkyl sulfates and alpha olefin sulfonates.

Typically, the amount of foaming agent in the well treatment fluid is that amount sufficient to provide a foam quality between from about 30 to about 98, preferably 90 percent or higher. The foam quality is a measurement of the lowest amount of liquid volume of well treatment fluid that is required to effectuate the desired result. Thus, a 90 percent quality foam refers to the use of 100 ml of foamed well treatment fluid which, upon destabilization, rendered 10 ml of liquid well treatment fluid.

The pH buffer of the present invention helps maintain a low pH of the high temperature well treatment fluid in a range of about 4.0 to about 6.0. The pH buffer may comprise acetic acid and sodium acetate or a combination of acetic acid, sodium acetate, or formic acid.

In an aspect, the amount of pH buffer that is needed is the amount that will effectively maintain a pH of the high temperature well treatment fluid in a range of about 4.5 to about 5.25; or alternatively, in a range of about 4.75 to about 5; or alternatively, about 5. In an aspect, the pH buffer is a true pH buffer, as opposed to a pH adjuster, as will be understood by those of skill in the art. The low pH of the systems and methods described herein aid in clean up of the fluid after well treatment processes.

In an aspect where the high temperature well treatment fluid is foamed or energized, the amount of pH buffer that is needed is the amount that will effectively maintain a pH of the high temperature well treatment fluid in a range of about 5.3 to about 5.75 when the foaming gas is nitrogen and from about 4.1 to about 4.5 when the foaming gas is carbon dioxide.

At temperatures above 400° F. (204.4° C.), a pH buffer comprising acetic acid and sodium acetate having a pH of about 5 at 25% can be used. At temperatures below 400° F. (204.4° C.), other pH buffers can be used, such as acetic acid and formic acid buffers. Generally, any pH buffer capable of maintaining a pH of the high temperature well treatment fluid within in a range of about 4.5 to about 5.25 and without interfering with the remaining components of the high temperature well treatment fluids can be used. Other suitable pH buffers will be apparent to those of skill in the art and are to be considered within the scope of the present invention.

The pH buffer comprising acetic acid and sodium acetate having a pH of about 5 can be used in a concentration ranging from about 1 gallon per 1,000 gallons high temperature well treatment fluid to about 3 gallons per 1,000 gallons high temperature well treatment fluid, depending upon the temperature of the subterranean formation.

The high molecular weight synthetic copolymer can be further copolymerized with other monomers to provide various advantages related to the stability of the high temperature well treatment fluid. Similar to guar-based high temperature well treatment fluids, the viscosity of the high temperature well treatment fluid of the present invention can be significantly enhanced when first copolymerized with small amounts of monomers and crosslinked, at the wellsite, with transition metals, such as iron, titanium, zirconium, chromium, hafnium, aluminum, and combinations thereof. Suitable monomers that can be copolymerized with the high molecular weight synthetic polymer include monomers selected from the group consisting of an alkali metal of acrylamidomethylpropanesulfonic acid, an ammonium salt of acrylamidomethylpropanesulfonic acid, styrene sulfonate, vinyl sulfonate, N-vinylpyrolidone, N-vinylformamide, N-vinylacetamide, N,N-diallylacetamide, methacrylamide, acrylamide, N,N-dimethylacrylamide, methacrylamide, a divalent cation from calcium salt, a divalent cation from magnesium salt, and combinations thereof. For example, alkali metal or ammonium salts of acrylamidomethylpropanesulfonic acid (AMPS), styrene sulfonate or vinyl sulfonate can be copolymerized to add salt tolerance to the high molecular weight synthetic polymer. Divalent cations from calcium salt and magnesium salt are also useful for adding salt tolerance to the high molecular weight synthetic polymer. As another example, monomers such as N-vinylamides, N-vinylpyrolidone, N-vinylformamide, N-vinylacetamide, and N-diallylacetamide can also be copolymerized with the high molecular weight synthetic polymer to assist in proppant transport by adsorbing onto the proppant surface. The copolymers of the high molecular weight synthetic copolymer can be made by any polymerization method necessary to produce high molecular weight copolymers. A particularly effective method of producing the copolymers is by invert polymer emulsion because it can be easily metered into a flowing stream of water during fracturing processes and it can be made to rapidly hydrate, which may reduce the amount of equipment needed at the wellsite.

The high temperature well treatment fluid of the present invention can also include a stabilizer to help the high temperature well treatment fluids perform for extended periods of time. One manner in which stabilizers assist in extending run times of high temperature well treatment fluids is by maintaining the viscosity of the high temperature well treatment fluid for longer periods of time than the high temperature well treatment fluid would be capable of doing without the stabilizer. In an aspect, the stabilizer is sodium thiosulfate, phenothiazine, or combinations thereof. The use of phenothiazine as a stabilizer is described in co-pending U.S. patent application Ser. No. 12/020,755, filed on Jan. 28, 2008. Another suitable stabilizer is a gel stabilizer that is commercially available as GS-1L that contains sodium thiosulfate from Baker Hughes Incorporated.

In general, any stabilizer compound capable of maintaining viscosity of the high temperature well treatment fluid long enough to perform the fracturing process can be used. The amount of stabilizer that can be used includes an effective amount that is capable of maintaining viscosity, i.e. preventing thermal degradation, of the high temperature well treatment fluid long enough to perform the fracturing process.

In an aspect, the high temperature well treatment fluid of the present invention can also include a crosslinking agent. A suitable crosslinking agent can be any compound that increases the viscosity of the high temperature well treatment fluid by chemical crosslinking, physical crosslinking, or any other mechanisms. For example, the gellation of the high molecular weight synthetic copolymer can be achieved by crosslinking the high molecular weight synthetic copolymer with metal ions including boron, zirconium, and titanium containing compounds, or mixtures thereof. One class of suitable crosslinking agents is zirconium-based crosslinking agents. Suitable crosslinking agents can include zirconium oxychloride, zirconium acetate, zirconium lactate, zirconium malate, zirconium glycolate, zirconium lactate triethanolamine, zirconium citrate, titanium lactate, titanium malate, titanium citrate, titanium, aluminum, iron, antimony, a zirconate-based compound, zirconium triethanolamine, an organozirconate, or combinations thereof. XLW-14 is a particularly suitable zirconate-based crosslinking agent that is commercially available from Baker Hughes Incorporated and described in U.S. Pat. No. 4,534,870, which is incorporated by reference in its entirety.

The amount of the crosslinking agent needed in the high temperature well treatment fluid depends upon the well conditions and the type of treatment to be effected, but is generally in the range of from about 10 ppm to about 1000 ppm of metal ion of the crosslinking agent in the high molecular weight synthetic polymer fluid. In an aspect, the amount of crosslinking agent that can be used includes an effective amount that is capable of increasing the viscosity of the high temperature well treatment fluid to enable it to perform adequately in fracturing processes. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

When zirconium is used as a crosslinking agent, zirconium has a built-in delay and is used from 1 gallon per 1,000 gallons to 2 gallons per 1,000 gallons depending on the temperature and high molecular weight synthetic polymer concentration in the high temperature well treatment fluid. If extra stability time is required, an additional stabilizer, such as sodium thiosulfate (e.g., GS-1L from BJ Services), can be used in a range of about 1 gallon per 1,000 gallons high temperature well treatment fluid to about 3 gallons per 1,000 gallons high temperature well treatment fluid.

The high temperature well treatment fluid of the present invention can also include a surfactant to aid in well treatment processes. Surfactants typically aid in the hydration of the high molecular weight synthetic polymer. Without the surfactant, the high temperature well treatment fluids of the present invention can take up to about 20 to 30 minutes to adequately hydrate. With the addition of the surfactant, the hydration time is substantially reduced. With the surfactant, the hydration can take less than 5 minutes. 90-95% of the high temperature well treatment fluid of the present invention can be hydrated in about 1 to 2 minutes with a suitable surfactant. The type and concentration of the surfactant can control the hydration time of the high temperature well treatment fluid. Any suitable surfactant can be used, as will be apparent to those of skill in the art. In an aspect, a nonionic surfactant such as an ethoxylated alcohol can be used. A suitable surfactant that can be used in the present invention is a proprietary blend of two different surfactants commercially available from Rhodia. The Rhodia blend contains 50 wt. % Rhodasurf BC 720, which is an alkoxypoly(ethyleneoxy) ethanol surfactant, and an ethoxylated long chain alcohol having between 10 and 18 carbon molecules. In an aspect, the surfactant comprises alkoxypoly(ethyleneoxy)ethanol, an ethoxylated alcohol having from 10 to 18 carbon molecules, and combinations thereof. Effective types and amounts of suitable surfactants will be apparent to those of skill in the art and are to be considered within the scope of the present invention.

In an aspect of the present invention, the high temperature well treatment fluid also includes a breaker that is capable of degrading the high temperature well treatment fluid in a controlled manner to assist operators in clean up and removal of the high temperature well treatment fluid when the well treatment process is complete. For example, the breakers can assist in clean-up efforts after fracturing treatments. Viscometer tests have shown that most breakers that contain oxidizing agents are useful in the degradation of the fluid. Suitable oxidizing agents can include sodium bromate, ammonium persulfate, sodium persulfate, sodium perborate, sodium percarbonate, calcium peroxide, magnesium peroxide and sodium periodate. Controlled degradation can be recognized because it results in a simultaneous and controlled reduction in fluid viscosity. Testing suggests that the stability of the high temperature well treatment fluid of the present invention, even with the intentional addition of the breakers that contain oxidizing agents, greatly exceeds that obtained by guar-based well treatment fluids, allowing optimized treatments to be employed at well temperatures ranging from 250° F. (121.1° C.) to 500° F. (260° C.). The breaker can also be an enzyme.

In an aspect, the breaker comprises sodium bromate, either as is or encapsulated. Sodium bromate has been shown to easily degrade the high temperature well treatment fluid in a controlled manner. In an aspect, the breaker comprises sodium bromate, ammonium persulate, sodium persulfate, sodium perborate, sodium percarbonate, calcium peroxide, magnesium peroxide, sodium periodate, an alkaline earth metal percarbonate, an alkaline earth metal perborate, an alkaline earth metal peroxide, an alkaline earth metal perphosphate, a zinc peroxide, a zinc perphosphate, a zinc perborate, a zinc percarbonate, a boron compound, a perborate, a peroxide, a perphosphate, or combinations thereof. the breaker comprising sodium bromate, ammonium persulate, sodium persulfate, sodium perborate, sodium percarbonate, calcium peroxide, magnesium peroxide, sodium periodate, or combinations thereof. Other types and amounts of suitable breakers that can be used in the present invention will be apparent to those of skill in the art are to be considered within the scope of the present invention.

When sodium bromate is used to break the high temperature well treatment fluid of the present invention, the concentration of the sodium bromate can be from about 0.5 ppt high temperature well treatment fluid to 20 ppt high temperature well treatment fluid. The concentration will depend on if the sodium bromate is run as a solid, a solution, or encapsulated, such as High Perm BR™ Gel Breaker from Baker Hughes Incorporated.

The pH buffers, stabilizers, crosslinking agents, breakers, monomers, and other additives described herein can be used in the method embodiments as well as the compositional embodiments of the present invention. Other suitable compounds for high temperature well treatment fluids, such as proppant and other additives, will be apparent to those of skill in the art and are to be considered within the scope of the present invention.

Besides the compositions of the high temperature well treatment fluid, methods of fracturing a subterranean formation having a temperature of up to about 500° F. (260° C.) are provided as embodiments of the present invention. In one embodiment, a high temperature well treatment fluid is contacted with at least a portion of the subterranean formation at pressures sufficient to fracture the subterranean formation. In an aspect, the high temperature well treatment fluid includes water; a high molecular weight polymer comprising acrylamide, acrylamidomethylpropanesulfonic acid, and vinyl phosphonate; a crosslinking agent; and a pH buffer that maintains a pH of the high temperature well treatment fluid in a range of about 4.5 to about 5.25.

Another method of fracturing a subterranean formation is provided as another embodiment of the present invention. In this embodiment, water is contacted with a high molecular weight copolymer derived from acrylamide, acrylamidomethylpropanesulfonic acid, and vinyl phosphonate to form a water-soluble polymer that is then contacted with a crosslinking agent and a pH buffer to produce a gelling fluid. The gelling fluid is then contacted with at least a portion of the subterranean formation at pressures sufficient to fracture the formation. As with other embodiments of the present invention, the pH buffer maintains a pH of the gelling fluid in a range of about 4.5 to about of about 5.25.

Another method of fracturing a subterranean formation is provided as another embodiment of the present invention. In this embodiment, water is contacted with a high molecular weight copolymer derived from acrylamide, acrylamidomethylpropanesulfonic acid, and vinyl phosphonate to form a water-soluble polymer. The water-soluble polymer is contacted with a crosslinking agent and a foaming agent to produce a foamed or energized fluid. At least a portion of the subterranean formation is contacted with the foamed or energized fluid at pressures sufficient to fracture the formation. The foamed or energized fluid may further contain a pH buffer, preferably to maintain the pH of the foamed or energized fluid in a range of about 4.0 to about 6.0.

The compositions and methods described herein perform well when compared with traditional guar-based well treatment fluids. Well treatment fluids require sufficient viscosity that lasts long enough for the well treatment fluid to complete the well treatment process, such as fracturing. The compositions and methods describe herein are stabilized for much longer than most prior art well treatment fluids at elevated temperatures. For example, the high temperature well treatment fluid of the present invention can be pumped at a temperature of up to about 500° F. (260° C.) for a period of up to about 2 hours. The high temperature well treatment fluid can be pumped at a temperature of up to about 425° F. (218.3° C.) for a period of up to about 4 hours. The high temperature well treatment fluid can be pumped at a temperature of up to about 400° F. (204.4° C.) for a period of up to about 6 hours.

The methods and compositions of the present invention do not require any new or additional equipment. Traditional well treatment fluid equipment can be used without any modification. The methods and compositions of the present invention can be used in subterranean formations having higher temperatures than many prior art well treatment fluids are capable of functioning properly.

EXAMPLES

Example 1

Figure 1:
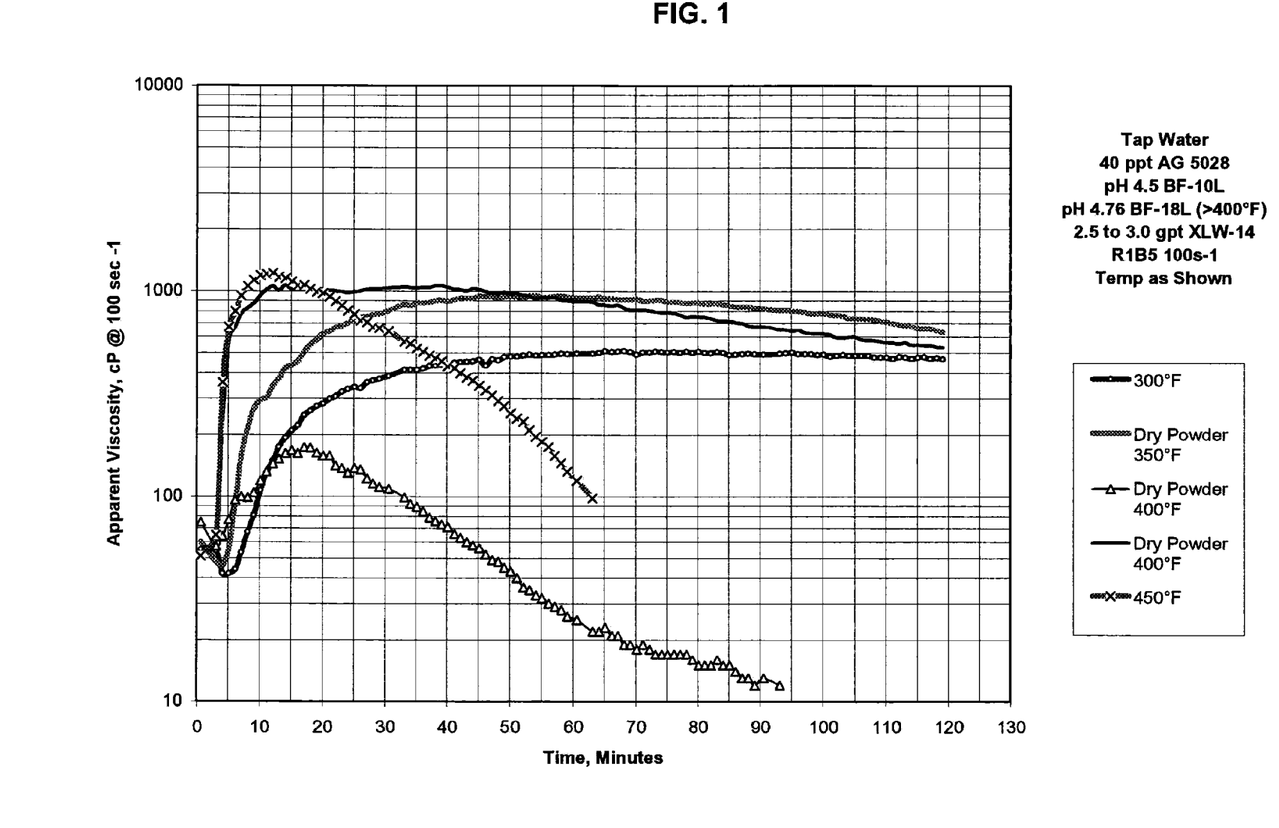
FIG. 1 is a graph of the apparent viscosity of the high temperature well treatment fluid with and without a breaker versus time at various temperatures in accordance with embodiments of the present invention.

Samples of the high temperature well treatment fluid of the present invention were prepared by mixing 40 pounds of copolymer derived from acrylamide and acrylamidomethylpropanesulfonic acid in one thousand gallons (ppt) tap water and allowed to hydrate for 30 minutes. A suitable copolymer that was used in this example is commercially available as Allessan® AG 5028P from Allessa Chemie. The order of addition of the additives is as it appears in FIG. 1. As shown in FIG. 1, the apparent viscosity in centipoises (cP) was measured and plotted for the high temperature well treatment fluid at temperatures ranging from 300° F. (148.9° C.) to 500° F. (260° C.) using a $R_1B_5$ bob and cup combination against time in minutes. FIG. 1 shows stability of the high temperature well treatment fluid of the present invention without the use of breakers. The pH was controlled using two different pH buffers. As indicated in FIG. 1, some of the samples were added as a dry powder to the fracturing fluid, while others were prepared in an emulsion. A pH of 4.5 with acetic acid (BF-10L by Baker Hughes Incorporated) was used in the samples up to 400° F. (204.4° C.). A pH of 4.76 with a true buffer of pH 4.5 (BF-18L by Baker Hughes Incorporated) was used in the samples that were greater than 400° F. (204.4° C.). 2.5 to 3.0 gpt of a zirconate-based crosslinking agent (XLW- 14 by Baker Hughes Incorporated) was used in the samples. Two samples were made and measured at 400° F. (204.4° C.), one of the samples was prepared with 0.06 wt. % sodium thiosulfate gel stabilizer and the other sample was prepared without the stabilizer. As can be seen in FIG. 1, the sample at 400° F. (204.4° C.) with the stabilizer performed much better than the sample without the stabilizer, i.e., it maintained its viscosity for a longer period of time than the sample without the stabilizer.

Example 2

Figure 2:
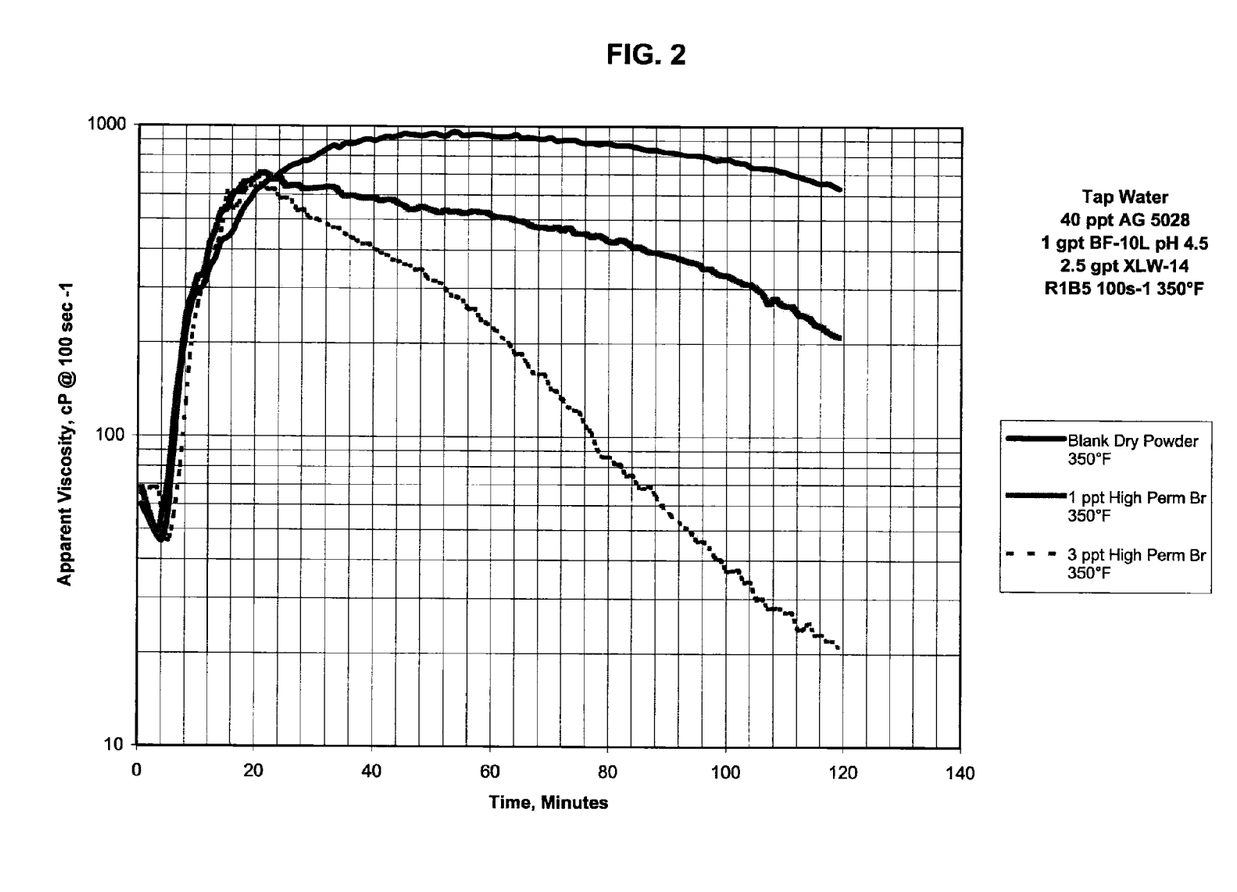
FIG. 2 is a graph of the apparent viscosity of the high temperature well treatment fluid with and without a breaker versus time at 350° F. (176.7° C.) in accordance with embodiments of the present invention.

Three samples of the high temperature well treatment fluid of the present invention were prepared by mixing 40 pounds of copolymer derived from acrylamide, acrylamidomethylpropanesulfonic acid, and vinyl phosphonate in one thousand gallons tap water (Allessan® AG 5028P from Allessa Chemie) and allowed to hydrate for 30 minutes. The order of addition of the additives is as it appears in FIG. 2. As shown in FIG. 2, the apparent viscosity was measured and plotted for the high temperature well treatment fluid at 350° F. (176.7° C.) using a $R_1B_5$ bob and cup combination against time in minutes. The pH was controlled using 1 gpt of acetic acid to pH 4.5 (e.g., BF-10L by Baker Hughes Incorporated). 2.5 gallons per 1,000 gallons high temperature well treatment fluid (gpt) of a zirconate-based crosslinking agent (e.g., XLW-14 by Baker Hughes Incorporated) was used in the samples. The first sample was made without the use of a breaker. The second and third samples were prepared with one and three ppt respectively of an encapsulated sodium bromate labeled as High Perm Br in FIG. 2 (High Perm BR™ Gel Breaker from Baker Hughes Incorporated). As can be seen in FIG. 2, the viscosity tapers off at a consistent rate with each of the samples that contain the sodium bromate breaker, which indicates that the high temperature well treatment fluid can be degraded in a controlled manner. The viscosity of the second sample with 1 ppt breaker decreased slower than the viscosity of the third sample having 3 ppt breaker.

Example 3

Figure 3:
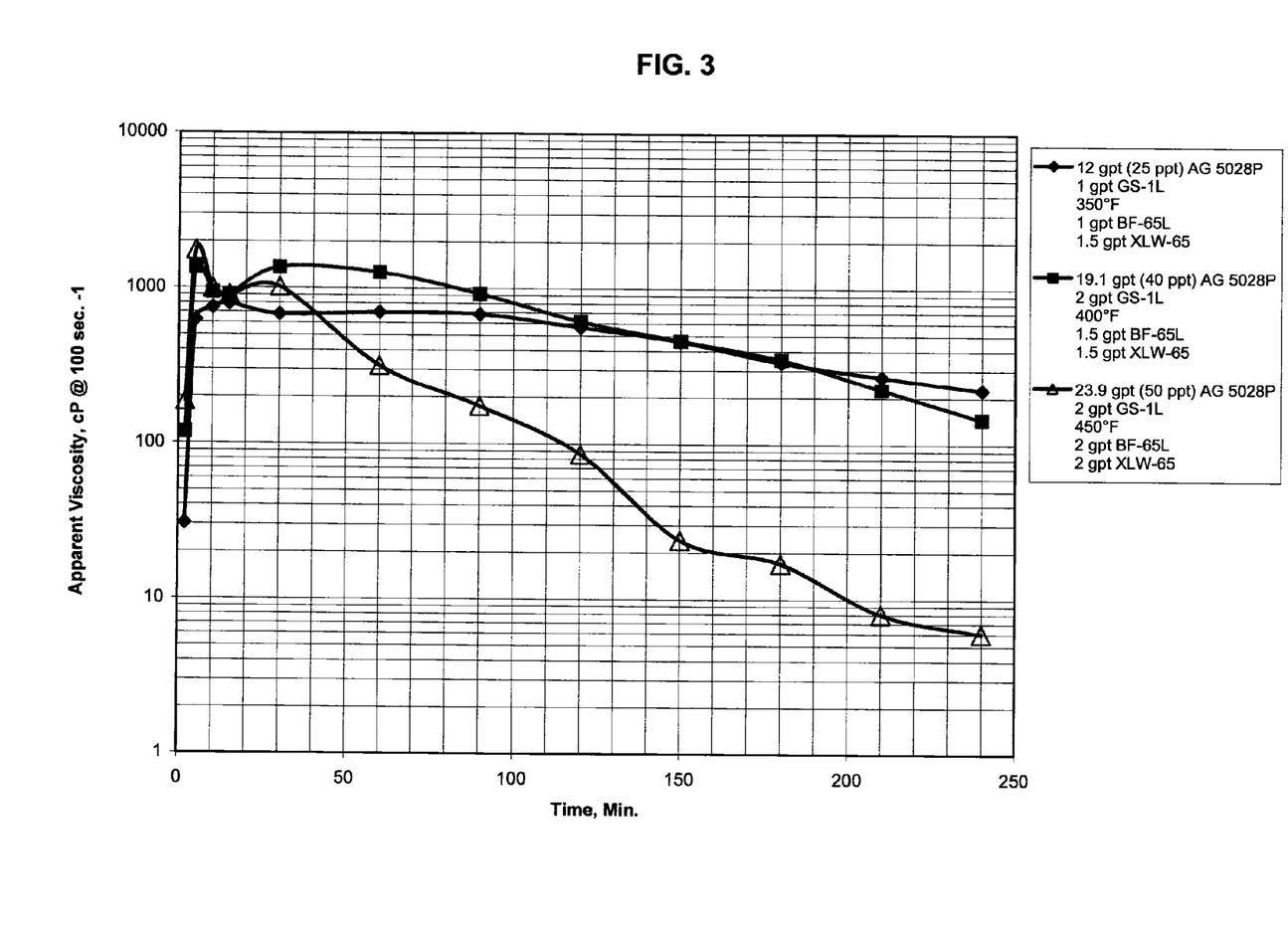
FIG. 3 is a graph of the apparent viscosity of the high temperature well treatment fluid with various amounts of copolymer and temperatures in accordance with embodiments of the present invention.

Three samples of the high temperature well treatment fluid of the present invention were prepared by mixing varying amounts of copolymer derived from acrylamide, acrylamidomethylpropanesulfonic acid, and vinyl phosphonate with tap water (Allessan® AG 5028P with a built in stabilizer from Allessa Chemie) and allowed to hydrate for 30 minutes. The components, order of addition, and conditions in this example are as follows:

| Component/Condition | Sample 1 | Sample 2 | Sample 3 |
|---|---|---|---|
| Copolymer (AG 5028P), ppt | 25 | 40 | 50 |
| Gel stabilizer (GS-1L), gpt | 1 | 2 | 2 |
| Buffer (BF-65L), gpt | 1 | 1.5 | 2 |
| Crosslinking agent (XLW-65), gpt | 1.5 | 1.5 | 2 |
| Temperature, ° F. (° C.) | 350 (176.7) | 400 (204.4) | 450 (232.2) |

The gel stabilizer GS-1L, buffer BF-65L, and crosslinking agent XLW-65 are all commercially available from Baker Hughes Incorporated. As shown in FIG. 3, the apparent viscosity was measured and plotted for the high temperature well treatment fluid at temperatures ranging from 350° F. (176.7° C.) to 450° F. (232.2° C.) using a $R_1B_5$ bob and cup combination against time in minutes. The pH was controlled using a true 5.0 pH buffer (e.g., BF-65L by Baker Hughes Incorporated). As can be seen in FIG. 3, the viscosity tapers off at a consistent rate with each of the samples, which indicates that the high temperature well treatment fluid can be stable for an extended period of time and still be degraded in a controlled manner.

Example 4

Figure 4:
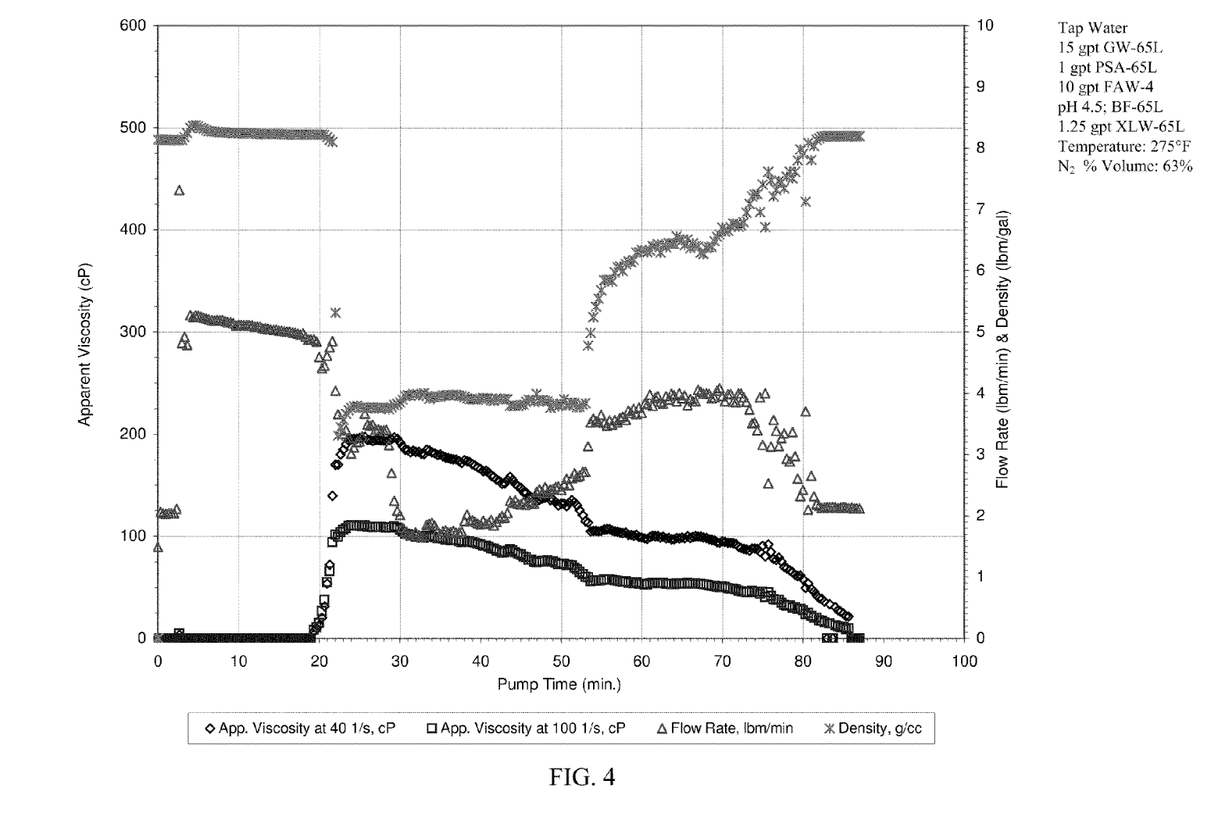
FIG. 4 is a graph of the apparent viscosity of the high temperature well treatment fluid with 63 volume percent nitrogen in accordance with embodiments of the present invention.

Samples of a high temperature well treatment fluid were prepared by mixing 15 gallons of GW-65L, a copolymer of Baker Hughes Incorporated derived from acrylamide and acrylamidomethylpropanesulfonic acid, in one thousand gallons (ppt) tap water which further contained about 140 ppm phenothiazine. The fluid was allowed to hydrate for 30 minutes with the addition of about 1 gpt of PSA-65L, a product of Baker Hughes Incorporated. The pH was controlled using BF-65L buffer and XLW-65 was used as the crosslinker. FAW-4 foamer, a product of Baker Hughes Incorporated, and nitrogen was introduced to the fluid to provide 63 vol. % nitrogen. The order of addition of the additives is as it appears in FIG. 4. The rheology of the fluid was then evaluated using a flow-loop rheometer which was equipped with a constant volume circulating pump and an independent air driven pump. The flow-loop was further fitted with a 10,000 psi site glass for observation. The foamed fluid was passed through the closed loop rheometer for 20 minutes. As shown in FIG. 4, the foam is stable over an extended period of time.

Example 5

Figure 5:
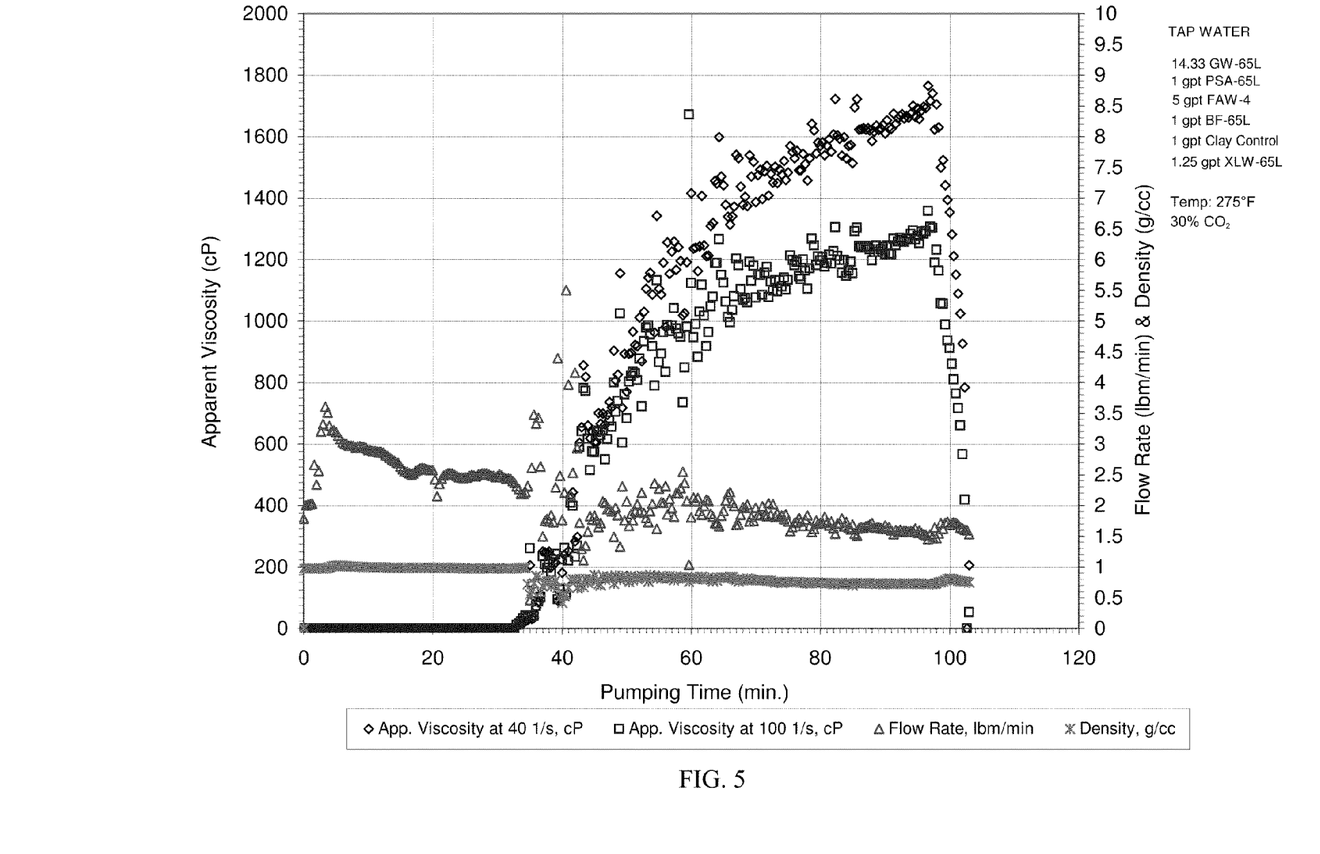
FIG. 5 is a graph of the apparent viscosity of a high temperature well treatment fluid energized with 30 volume percent carbon dioxide in accordance with embodiments of the present invention.

Samples of a high temperature well treatment fluid were prepared by mixing 15 gallons of GW-65L, a copolymer of Baker Hughes Incorporated derived from acrylamide and acrylamidomethylpropanesulfonic acid, in one thousand gallons (ppt) tap water which further contained about 140 ppm phenothiazine. The fluid was allowed to hydrate for 30 minutes with the addition of about 1 gpt of PSA-65L, a product of Baker Hughes Incorporated. The pH was controlled using BF-65L buffer and XLW-65 was used as the crosslinker and Claytreat-3C clay stabilizer, a product of Baker Hughes Incorporated. FAW-4 foamer, a product of Baker Hughes Incorporated, and carbon dioxide were introduced to the fluid to provide 30 volume percent carbon dioxide. The order of addition of the additives is as it appears in FIG. 5. The foamed fluid was then passed through a closed loop rheometer for approximately 40 minutes. As shown in FIG. 5, fluid exhibited greater viscosity than the fluid of Example 4 and the fluid was stable over an extended period of time.

While the invention has been shown or described in only some of its forms, it should be apparent to those skilled in the art that it is not so limited, but is susceptible to various changes without departing from the scope of the invention. For example, various types of additives can be used in the high temperature well treatment fluid of the present invention. As another example, various types of equipment can be used for the well treatment processes described herein.

What is claimed is:

1. A method of fracturing a subterranean formation having a temperature of from about 300° F. (149° C.) to about 500° F. (260° C.), the method comprising the step of contacting a high temperature well treatment fluid comprising water; a high molecular weight copolymer derived from acrylamide, acrylamidomethylpropanesulfonic acid, and vinyl phosphonate; a crosslinking agent; a stabilizer comprising phenothiazine or a combination of sodium thiosulfate and phenothiazine; and a foaming agent, with at least a portion of the subterranean formation at pressures sufficient to fracture the subterranean formation.

2. The method of claim 1, wherein the foaming agent is a foaming gas selected selected from the group consisting of nitrogen and carbon dioxide and mixtures thereof.

3. The method of claim 1, wherein the foam quality of the high temperature well treatment fluid is between from about 20 to about 98 volume percent.

4. The method of claim 1, wherein the pH of the high temperature well treatment fluid is between from about 4.0 to about 6.0.

5. The method of claim 2, wherein the foaming gas is nitrogen.

6. The method of claim 5, wherein the pH of the high temperature well treatment fluid is from about 5.3 to about 5.75.

7. The method of claim 2, wherein the foaming gas is carbon dioxide.

8. The method of claim 7, wherein the pH of the high temperature well treatment fluid is from about 4.1 to about 4.5.

9. The method of claim 3, wherein the foaming agent is nitrogen or liquid $CO_2$ and is present in a quantity, by volume of 53 to in excess of 96 volume percent.

10. The method of claim 3, wherein the high temperature well treatment fluid is an energized fluid when the foaming agent is present in an amount to provide between from 5 to 53 by volume percent internal gas or a foamed fluid when the foaming agent is present in an amount to provide greater than 53 by volume percent internal gas.

11. The method of claim 1, wherein the high molecular weight copolymer is present in a range of about 10 gallons per 1,000 gallons gelling fluid to about 25 gallons per 1,000 gallons gelling fluid.

12. A method of fracturing a subterranean formation having a temperature of from about 300° F. (149° C.) to about 500° F. (260° C.), the method comprising contacting at least a portion of the subterranean formation with a crosslinked foamed or energized well treatment fluid at a pressure sufficient to create or enlarge a fracture, the crosslinked foamed or energized well treatment fluid being derived from water; a high molecular weight copolymer derived from acrylamide, acrylamidomethylpropanesulfonic acid, and vinyl phosphonate; a crosslinking agent; a stabilizer comprising phenothiazine or a combination of sodium thiosulfate and phenothiazine; and a foaming agent and further wherein the amount of foaming agent in the foamed or energized fluid is such as to provide between from 5 to 53 percent by volume internal gas for energized fluids or between from about 53 to 96 percent by volume internal gas for foamed fluids.

13. The method of claim 12, wherein the foaming agent is nitrogen or carbon dioxide.

14. The method of claim 12, wherein the pH of the foamed or energized well treatment fluid is between from about 4.0 to about 6.0.

15. A method of fracturing a subterranean formation having a temperature of from about 300° F. (149° C.) to about 500° F. (260° C.), the method comprising contacting at least a portion of the subterranean formation with a foamed or energized well treatment fluid at pressures sufficient to create or enlarge fractures in the formation, the foamed or energized well treatment fluid comprising water, a high molecular weight copolymer derived from acrylamide, acrylamidomethylpropanesulfonic acid, and vinyl phosphonate, a crosslinking agent, a stabilizer comprising phenothiazine or a combination of sodium thiosulfate and phenothiazine, and a pH buffer for maintaining a pH of the fluid in a range of about 4.0 to about of about 6.0.

16. The method of claim 15, wherein the high molecular weight copolymer has a K-value of greater than about 375.

17. The method of claim 15, wherein the high molecular weight copolymer is present in a range of about 10 gallons per 1,000 gallons high temperature well treatment fluid to about 25 gallons per 1,000 gallons high temperature well treatment fluid.

18. The method of claim 15, wherein the high molecular weight copolymer further comprises a monomer selected from the group consisting of an alkali metal of acrylamidomethylpropanesulfonic acid, an ammonium salt of acrylamidomethylpropanesulfonic acid, styrene sulfonate, vinyl sulfonate, N-vinylpyrolidone, N-vinylformamide, N-vinylacetamide, N,N-diallylacetamide, methacrylamide, acrylamide, N,N-dimethylacrylamide, methacrylamide, a divalent cation from calcium salt, a divalent cation from magnesium salt, and combinations thereof.

19. The method of claim 15, wherein the pH buffer comprises acetic acid, sodium acetate, formic acid, or combinations thereof and is present in a range of about 1 gallon per 1,000 gallons gelling fluid to about 3 gallons per 1,000 gallons gelling fluid.

20. The method of claim 15, wherein the foamed or energized treatment fluid further comprises an enzyme breaker.

* * * * *